UNITED STATES PATENT OFFICE 2,414,661

COPPER FUNGICIDES AND PROCESS OF PRODUCING SAME

Alexander A. Nikitin, Copperhill, Tenn., assignor to Tennessee Copper Company, New York, N. Y., a corporation of New Jersey No Drawing. Original application June 27, 1942, Serial No. 448,846. Divided and this application August 26, 1943, Serial No. 500,149

9 Claims. (Cl. 260—113)

This invention relates to fungicides and comprises a new and useful fungicide and the process of making the same.

Fungicides are well known in which copper enters as an element, such, for example, as Bordeaux mixtures. When a fungicide is sprayed on a crop it should be uniformly and evenly distributed over the entire surface of the crop to be effective and should efficiently adhere thereto, should stand what is called "weathering," and should be free from any injurious effect upon the crop. All fungicides with which I am familiar and in which copper enters as an active ingredient are lacking in one or more of these essentials. Furthermore, some of the fungicides are composed of a plurality of constituents which have to be mixed by an attendant when they are applied to the crop, and unless they are mixed in proper proportions and in the proper way their efficiency is reduced if not destroyed. They are undesirable for this reason.

Repeated attempts have been made with slight success to improve the physical properties of basic copper sulphate by the addition of supplementary materials such as vegetable flour. The addition of the alkali salts of the protein substances such as calcium caseinate helped to improve the covering properties of basic copper sulphate but it was found that the adherence of the spray residue of the copper fungicides was greatly reduced. The protein substances such as casein or soya flour by themselves did not improve the spreading properties since it was very difficult to disperse them in water without the addition of alkali. It should be emphasized that the deleterious action of alkali was not confined to the poor adherence only but it also rendered basic copper sulphate incompatible with organic insecticides, such as derris or pyrethrum. Further the handling of these protein substances for spray application required skill and knowledge not possessed by the average farmer.

The effort to introduce the protein substances such as casein failed when the casein was used without excessive amount of alkali since the final product was not readily wettable.

The present invention has for its object to provide a fungicide in which copper enters as an effective ingredient, which has highly toxic properties; which is chemically stable in the presence of alkalies such as lime and which is stable upon exposure to atmospheric action; which is readily wettable, and has good spreading and adhering properties, which is free of injurious effects on the crop, and which is ready to be applied to the crop by dusting or by merely dispersing the same in a suitable amount of water.

It was found that when a solution of a copper salt and a zinc salt is precipitated with an alkali solution containing soya bean protein, or soaps of the fatty acids, the resultant copper and zinc salt compound possesses improved physical properties, such as spreading, sticking and dispersion, as well as high toxicity. The soya bean protein or soaps of fatty acids is combined with the copper, through the aid of the zinc to form the new compound which possesses improved physical and chemical properties. The new copper fungicides are stable chemically when they are exposed to atmospheric action. They are compatible with lime and lead arsenate plus lime. They are also compatible with oil emulsions and with organic insecticides such as pyrethrum and rotenone. They also retain their neutral character in water suspension, and during storage.

The procedure which is followed in the preparation of the improved fungicide involves dissolving a copper salt in water with a zinc salt, which is for convenience designated solution A.

I then introduce into a suitable amount of water a protein-containing material preferably soya bean flour (about 50% protein) or soaps of a fatty acid such as oleic, stearic or linoleic, together with an alkali such as ammonium hydroxide. This for convenience I designate solution B.

I then add solution B to solution A until the resulting slurry is approximately neutral (pH 6.8–6.9) thereby precipitating a basic copper zinc-sulphate proteinate. This precipitate is filtered and the filter cake is reduced to a finely divided powder, and it is then ready for use. This finely divided basic copper zinc-sulphate proteinate may be dusted on the crop or may be dispersed in water at various concentrations depending upon the crop and the extent of the fungus infection on the crop.

In making solution A the proportions of copper salt and zinc salt employed may be varied, depending upon the amount of protein or soaps of fatty acids that are used. Thus, 30 parts of the zinc sulphate may be added to 100 parts copper sulphate ($CuSO_4 \cdot 5H_2O$) or the amount of zinc sulphate may be decreased to any desired extent down to 5 parts of zinc sulphate to 100 parts of copper sulphate.

In making solution B the concentration may be varied according to the character of the alkali used, since the amount of alkali used will depend upon the ratio between the copper sulphate and zinc sulphate employed. In actual practice it is necessary to add solution B to solution A until complete precipitation takes place at about pH 6.8, which pH should not be substantially departed from in order to avoid the formation of soluble cupro ammonium compounds which form with an excess of ammonia. If the pH of the slurry is carried beyond that point the complete precipitation of the components will not be secured.

For the purpose of illustrating one embodiment of the inventive idea reference is made to the following example, but it is to be expressly understood that the invention is not limited to this specific example. The choice of the copper salt and zinc salt to be used in solution A may be varied. The proportions of zinc sulphate may be varied anywhere within 5% to approximately 30% of the copper sulphate employed. This gives from 1% to 10% zinc as zinc oxide in the finished product. Moreover any protein-bearing material, whether vegetable or animal, as well as soaps of fatty acids may be employed and the percentage thereof varied. However, the amount of protein material in solution B should be such as to give from 0.5 to 3.5% protein in the finished product.

As an example, dissolve in water 100 grams of copper sulphate and 25 grams of zinc sulphate thus forming solution A. Then dissolve 1 to 7 grams of soya bean flour and 40 grams of ammonium hydroxide about 25% of $NH_3$ in water, thus forming solution B. Then add solution B to solution A until the resulting slurry reaches a pH of approximately 6.8, then filter the resulting precipitate and reduce it to a fine powder.

I discovered that when the zinc and copper salts were precipitated in one operation with an alkali solution containing soya bean protein or the soap of a fatty acid they formed a copper zinc compound which furnished a higher amount of soluble copper and consequently was more effective in the control of fungus disease. Basic copper sulphate in the commonly available copper fungicides when in water suspension forms about 1.5 parts per million of soluble copper, which is not sufficient for the effective control of fungus disease. The amount of soluble copper is increased by the use of soya flour protein to about 24.5 parts per million. This is superior to calcium caseinate which increases the amount of soluble copper to 103.6 parts per million but it has such an inferior tenacity coefficient that soya bean protein is superior in performance.

It was noted that when a copper sulphate solution was precipitated with an alkali solution containing soya bean protein or soaps of fatty acids but without zinc sulphate, the resultant copper compounds such as basic copper sulphate or carbonate plus copper proteinate are practically unwettable by water. Further these compounds showed a reduced toxicity to spore germination, which is attributed to their lower wettability by water. When, however, soya bean protein or soaps of fatty acids are added to the alkali solution and a zinc salt is precipitated with copper sulphate, the resultant copper compound is readily wettable.

The orientation of the molecules in the surfaces is a material factor in the wetting of the soya bean protein or the soaps of the fatty acids which are introduced into the copper fungicides. Apparently the hydrophylic, or friendly-to-water ends of the fatty acid molecules when they are precipitated in combination with the zinc salt, are turned outward in the surface in such condition that they are easily wettable by water, while the hydrophobic or "greasy" ends are turned inward in the surface.

When a soluble zinc salt is added to the copper sulphate solution and then precipitated with an alkali solution containing soya bean protein, or the soaps of fatty acids, the resultant copper compounds, such as copper zinc carbonate and basic copper zinc sulphate containing soya bean protein or soaps of fatty acids show improved spreading and adherence properties. When a zinc salt and copper sulphate solution are coprecipitated with an alkali free from soya bean protein or soaps of fatty acids, the resultant copper compound does not show any improvement in spreading properties. Satisfactory spreading and sticking properties are obtained when soya bean protein and a soluble zinc salt are introduced into the reagents before the precipitation of the copper compound has taken place. Good results were secured in spore germination tests and in the spray field in the control of bitter rot on apples with basic copper zinc sulphate proteinate.

The copper fungicides of the present invention possess superior toxicity or killing power to basic copper sulphate as shown by tests on culture suspension of *Macrosporium solani* and *Glomerella cingulata* spores, as follows:

| Expt. No. | Material | Dilution equivalent to Bordeaux mixture | Per cent Cu | Per cent spore germination | |
|---|---|---|---|---|---|
| | | | | Macrosporium solani | Glomerella cingulata |
| | Check | | | 87 | 89 |
| 1 | Basic copper sulphate. | 0.50-50 | 0.030 | 34 | 28 |
| 2 | ----do---- | 1.00-50 | .060 | 21 | 17 |
| 3 | ----do---- | 1.50-50 | .090 | 10 | 8 |
| 4 | Basic copper-zinc sulphate proteinate. | 0.50-50 | .030 | 20 | 17 |
| 5 | ----do---- | 1.00-50 | .060 | 11 | 3 |
| 6 | ----do---- | 1.50-50 | .090 | 3 | 2 |

The same advantages of the copper fungicides of the present invention were shown by extensive field tests that demonstrated vastly superior control of fungus diseases, as proved by increased yield of celery crops which are extremely sensitive to blight infection. This was in contrast to regular basic copper sulphate.

It is again emphasized that the spreading and adhesive properties of the new copper fungicide are superior to those of either the regular basic copper sulphate compounds or the compounds of copper and zinc without protein. This is of great importance in order to insure completeness of contact between the pathogenic organism and the spray residue and especially so when used on glossy citrus leaves. Further these improved fungicides are readily dispersed in water and they will remain in suspension without the addition of an auxiliary dispersing agent.

The new copper fungicides have a much higher chemical stability when used in connection with insecticides such as arsenical compounds, pyrethrum and rotenone. When commonly available basic copper sulphates are used with arsenical compounds in a spray mixture it is required that lime should be used to reduce arsenical injury. The use of lime in this case reduces the effectiveness of the copper fungicide due to chemical interaction with the copper fungicide which has a tendency to decompose, as shown by its blackening, when it is in water suspension in combination with arsenicals plus lime. On the other hand, the new copper fungicide being compatible with lime and arsenicals and the fungicide remains stable and its effectiveness remains substantially unchanged. The buffering action toward weak organic acids makes these copper compounds safer to use on fruit and foliage, and thus extends their use to a greater variety of plants.

It should be noted that when the zinc content determined as zinc oxide is reduced to 1% and no protein is present the adherence property is only slightly improved and the covering property shows no improvement as compared with regular basic copper sulphate. Further when the zinc oxide content of the final product is increased to about 10% and no protein is present the adherence of the resultant basic copper zinc sulphate or copper zinc carbonate is reduced. When the zinc oxide content is in a range between 1 and 10%, and the soya bean protein or soaps of fatty acids is in a range between 0.5 and 3.5% on the basis of the final product, the chemical stability and the physical properties, such as dispersing, spreading and sticking, are greatly improved as compared with regular basic copper sulphate, copper carbonate, or copper zinc compounds without protein. When no zinc oxide is present the resultant basic copper sulphate or copper carbonate containing protein is repellent to water. This is especially true when the protein content of the compound is above 1%. On the other hand, when a mixture of copper sulphate and zinc sulphate is precipitated with an alkali containing soya bean protein or soaps of fatty acids, the resultant basic copper zinc sulphate or copper zinc carbonate is readily wettable by water. The presence of the zinc group changes the properties of the resultant copper compound in the presence of the protein group from hydrophobic to hydrophylic.

Other copper and zinc salts and oxides may be used in place of copper sulphate and zinc sulphate maintaining the same ratio between copper oxide and zinc oxide. Further the alkali used may be either volatile, such as ammonium hydroxide, or fixed such as the bases of sodium, potassium, calcium or magnesium; and in place of the preferred soya bean flour which contains about 53.6% protein dried skim milk, wheat flour or soaps of fatty acids such as oleic, stearic, linoleic may be used.

This application is a division of my copending application Serial No. 448,846, filed June 27, 1942.

What is claimed is:

1. The process of manufacturing copper fungicides which consists in reacting an aqueous solution of a copper salt and a zinc salt selected from the group consisting of copper and zinc sulphates and copper and zinc carbonates with an alkali and a protein selected from the group consisting of casein, soya flour, skim milk and wheat flour, the alkali and protein being added to the solution until the pH of the mixture becomes approximately neutral, and precipitating a basic copper zinc salt proteinate.

2. The process of manufacturing copper fungicides which consists in reacting an aqueous solution of copper and zinc salts selected from the group consisting of copper and zinc sulphates and copper and zinc carbonates with an alkali and a protein, the alkali and protein being added to the solution until the pH of the mixture becomes approximately neutral, and precipitating a basic copper zinc salt proteinate.

3. The process of manufacturing a copper fungicide which consists in preparing an aqueous solution of copper and zinc salts selected from the group consisting of copper and zinc sulphates and copper and zinc carbonates, preparing an aqueous solution containing an alkali and a protein, reacting the two solutions by mixing them together until the pH of the mixture becomes approximately neutral, and precipitating a basic copper zinc salt proteinate.

4. The process of manufacturing a copper fungicide which consists in preparing an aqueous solution of copper and zinc salts selected from the group consisting of copper and zinc sulphates and copper and zinc carbonates, preparing an aqueous solution containing an alkali and a protein selected from the group consisting of casein, soya flour, skim milk and wheat flour, reacting the two solutions by mixing them together until the pH of the mixture becomes approximately neutral, and precipitating a basic copper zinc salt proteinate.

5. The process of manufacturing copper fungicides which consists in reacting an aqueous solution of a copper salt and a zinc salt selected from a group consisting of copper and zinc sulphates and copper and zinc carbonates with ammonium hydroxide and soya bean protein, the alkali and protein being added to the solution until the pH of the mixture becomes approximately neutral, and precipitating a basic copper zinc salt proteinate.

6. The process of manufacturing a copper fungicide which consists in preparing an aqueous solution of copper and zinc salts selected from the group consisting of copper and zinc sulphates and copper and zinc carbonates, preparing an aqueous solution containing ammonium hydroxide and soya bean protein, reacting the two solutions by mixing them together until the pH of the mixture becomes approximately neutral, and precipitating a basic copper zinc salt proteinate.

7. As a new fungicide product a basic copper zinc salt proteinate in which the copper and zinc salts are selected from the group consisting of copper and zinc sulphates and copper and zinc carbonates.

8. As a new fungicide product a basic copper zinc salt proteinate in which the copper and zinc salts are selected from the group consisting of copper and zinc sulphates and copper and zinc carbonates, the zinc content calculated as zinc oxide being in the range between 1% and 10% and the protein content in the range between 0.5% and 3.5%.

9. As a new fungicide product a basic copper zinc salt proteinate in which the copper and zinc salts are selected from the group consisting of copper and zinc sulphates and copper and zinc carbonates and the protein is selected from the group consisting of casein, soya flour, skim milk and wheat flour.

ALEXANDER A. NIKITIN.

Disclaimer 2,414,661.—*Alexander A. Nikitin*, Copperhill, Tenn. COPPER FUNGICIDES AND PROCESS OF PRODUCING THE SAME. Patent dated Jan. 21, 1947. Disclaimer filed Mar. 29, 1948, by the assignee, *Tennessee Copper Company*.

Hereby enters this disclaimer to the words "and copper and zinc carbonates" in line 5 of claims 1, 2, 3, 4, 5, and 6.

[*Official Gazette May 4, 1948.*]